(12) United States Patent
Mardones Soto et al.

(10) Patent No.: US 10,976,101 B2
(45) Date of Patent: Apr. 13, 2021

(54) HATCH DEVICE WHICH ALLOWS FOR A MINIMAL MODIFICATION IN THE SERVICE HATCH COVER'S STRUCTURE DURING INSTALLATION

(71) Applicant: Liventus Chile S.A., Santiago (CL)

(72) Inventors: Claudia Alejandra Mardones Soto, Calera de Tango (CL); Francisco Javier Valenzuela Rollán, Rengo (CL); Mariano Pola Matte, Santiago (CL)

(73) Assignee: Liventus S.A., Santiago (CL)

( * ) Notice: Subject to any disclaimer, the term of this patent is extended or adjusted under 35 U.S.C. 154(b) by 279 days.

(21) Appl. No.: 16/306,125

(22) PCT Filed: Aug. 3, 2016

(86) PCT No.: PCT/CL2016/000042
§ 371 (c)(1),
(2) Date: Nov. 30, 2018

(87) PCT Pub. No.: WO2018/014142
PCT Pub. Date: Jan. 25, 2018

(65) Prior Publication Data
US 2020/0340739 A1 Oct. 29, 2020

(30) Foreign Application Priority Data
Jul. 18, 2016 (CL) .................................. 1817-2016

(51) Int. Cl.
*F25D 29/00* (2006.01)
*B65D 88/74* (2006.01)
*F25D 11/00* (2006.01)
*F25D 17/04* (2006.01)
*F25D 23/02* (2006.01)
*A23B 7/148* (2006.01)

(52) U.S. Cl.
CPC ......... *F25D 29/003* (2013.01); *B65D 88/745* (2013.01); *F25D 11/003* (2013.01); *F25D 17/042* (2013.01); *F25D 23/028* (2013.01); *A23B 7/148* (2013.01); *A23V 2002/00* (2013.01); *F25D 2300/00* (2013.01); *F25D 2700/00* (2013.01)

(58) Field of Classification Search
CPC .... F25D 29/003; F25D 11/003; F25D 17/042; F25D 23/028; F25D 2300/00; F25D 2700/00; F25D 17/04; B65D 88/745; F16K 31/44; A23V 2002/00; A23B 7/148
See application file for complete search history.

(56) References Cited

U.S. PATENT DOCUMENTS

| | | | | |
|---|---|---|---|---|
| 7,625,277 B2 * | 12/2009 | Palmer | ...................... | F24F 11/77 454/255 |
| 8,562,399 B2 * | 10/2013 | Lubker | ............... | F24F 13/1426 454/323 |
| 2007/0256445 A1 * | 11/2007 | Grigoletto | ............... | F24F 1/028 62/408 |

* cited by examiner

*Primary Examiner* — Emmanuel E Duke
(74) *Attorney, Agent, or Firm* — Chambliss, Bahner & Stophel, P.C.

(57) ABSTRACT

A hatch device comprised by a main support body, a flow guide piece and an optional plug, which allows for minimum modifications in the service hatch cover's structure during installation.

15 Claims, 9 Drawing Sheets

HATCH DEVICE WHICH ALLOWS FOR A MINIMAL MODIFICATION IN THE SERVICE HATCH COVER'S STRUCTURE DURING INSTALLATION

FIELD OF THE INVENTION

The present invention is framed within the field of atmosphere control systems, where hatches are used to install air flow controllers or valves to be used in atmosphere control systems for controlled atmosphere containers that transport refrigerated cargo.

BACKGROUND OF THE INVENTION

Fresh food keeps breathing after harvesting. This means that it consumes oxygen, generates phytohormones such as ethylene and produces carbon dioxide; this causes a certain degree of spoilage during transport if the conditions of the environment in which the food is transported are not properly controlled.

The transport of fresh fruit involves a long period of time between its harvest and delivery to the final customer. During this period of transport, adequate means are involved to transport these fruits, which, unless they are in proper operating conditions, will result in early ripening and faster spoilage of the fruit.

Loading containers with refrigeration systems are mainly used for transporting fresh fruit from its production source to its point of sale. These containers are equipped with the necessary elements to reduce respiration, prevent spoilage and ripening of the fruit, keeping it in good condition. This transport condition is achieved by maintaining low temperatures, decreasing or increasing the amount of oxygen or carbon dioxide in the environment, and absorbing ethylene.

Two main approaches are used to keep the fruit in good condition. The first focuses on being able to maintain the low temperatures where the fruit is stored, to slow down its cellular metabolism, which ultimately reduces the gas exchange rate. The second approach, which complements low temperature control, is the external control and/or reduction of oxygen (replacing it with nitrogen, carbon dioxide or other inert gases), which also results in less cellular respiration. This increases the levels of carbon dioxide generated from the fruit or introduced externally to achieve three objectives simultaneously: a) biological control, restricting the growth of aerobic bacteria, preventing fruit spoilage, b) decreasing the respiratory rate when removing oxygen, decreasing the process of fruit spoilage and c) controlling the release of ethylene, to prevent early fruit ripening.

The types of containers normally used for the transport of fresh products are refrigerated containers with complete refrigeration systems, such as and/or refrigerated containers with adapted integral refrigeration systems. In general, this type of container is basically comprised by an area to place the cargo and a refrigeration system. The refrigeration system includes the refrigeration module(s), service hatches, ventilation hatches, evaporators, fans placed inside the chamber where the refrigeration module is installed (with the purpose of circulating the air inside the container, where the cargo is located), and an air inlet and outlet, such as those described in patents ES 2143858, ES 2036180 and/or WO2015178537, among others.

In order to be able to control all the parameters related to the deterioration and advanced ripening of the fruit that is transported in these refrigerated containers, a series of elements are also incorporated to maintain a controlled atmosphere in the cargo transport area inside the refrigerated container. This requires providing the refrigerated container with a device or valve that allows the atmosphere of the cargo area inside the container to be controlled during the transport period, as described in patent application CL 0948-2016, whose contents describe part of the present invention, where the various devices used to modify the atmosphere in a refrigerated container usually entail permanently modifying the container by drilling holes in its walls, in order to be able to set out the different elements and devices that comprise the atmosphere control system.

The controlled atmosphere systems placed in a refrigerated container and used in the art, consist of incorporating an atmosphere controlling device into the refrigeration area, where the service hatches are normally replaced or modified to incorporate a valve or device that controls all the parameters within the cargo area and that keeps the atmosphere controlled.

Modifying the service hatches of refrigerated containers to include an atmosphere control valve device involves drilling a hole in said hatch to secure the valve in it. The fact of having to drill a hole into one of the container's components implies that the means used to attach and hold the valve in place must be sufficiently airtight to maintain the controlled atmosphere and temperature inside the container. The need to remove the valve devices from their place of operation may also require an element to keep the container airtight.

It would therefore be desirable to have a device that provides optimum operational mechanical support for an atmosphere control valve device in a refrigerated cargo container, whose setup keeps the container airtight and ensures proper operation of the valve device, whether it is operational or not.

Maersk Container's document U.S. Pat. No. 8,562,399, published on Oct. 22, 2013, describes a vent valve with two valve openings in one valve plate, whose opening level is controlled with a valve element that rotates around the valve plate. It is provided in parallel with at least one valve opening in an air duct; however the disclosure of this document neither describes nor observes a supporting removable valve element or device to control the atmosphere in a refrigerated container with atmosphere control.

A device to regulate the atmosphere inside a chamber is disclosed in Mitsubishi Australia's document ES 2.279.648, published on Jan. 30, 2002, which includes means of airtight sealing to close the chamber, means of entry to allow the ambient atmosphere to enter the chamber, means of delivery to allow the chamber atmosphere to escape from the chamber, a controller to control the opening of the inlet media and means of reducing the concentration of carbon dioxide in the chamber, where the setup and form of retention of the controller and the air inlet valve to the chamber is neither described nor disclosed.

Atmosphere regulating controllers and valves are normally integrated into the service hatches of refrigerated containers. However, the shape and means through which they are placed and arranged in the container are not described in the prior art, where in general, the controllers and valves cover the same shape and surface as a service hatch cover. In addition, the prior art has not disclosed any means to attach and hold in place such air intake controllers and/or valves in an airtight manner, ensuring a minimal intervention in the container and that it can be easily transformed from a normal refrigerated container into a refrigerated container with a controlled atmosphere, by simply adding a removable atmosphere control valve device into a supporting device for it.

Therefore, there is also a need to provide a support device for an atmosphere controller and/or valve for a refrigerated container, whose setup allows for a minimum intervention of the container's service hatches, keeping the container airtight and at a stable temperature, while also providing an effective and airtight sealing of the space used to attach and support the atmosphere control device and/or valve when it has been removed.

On the other hand, this hatch device supporting the valve device must be able to channel air from different parts of the container to use the energy captured by convection and to channel it into the valve device for mechanical support, thus saving energy in the valve device.

One of the technical problems of the aforementioned inventions is that, although it is true that controlled atmosphere systems in a refrigerated container allow the transported fruit to be kept in good condition, they also require a series of major modifications that must be made to the container, as well as a large number of parts to achieve its proper operation, which translates into a system that is difficult to implement and maintain, and is also expensive.

A second technical problem associated with the aforementioned developments lies in the fact that for the atmosphere control valve device to operate properly, it must be placed in a specific manner within the space and not simply just "placed".

A third technical problem related to the aforementioned developments lies in the fact that in order to save energy, the atmosphere control valve device must be able to receive the air currents generated by convection in different parts of the container. This technical problem has never been mentioned in any of the documents of the prior art.

A fourth technical problem associated with the aforementioned developments is the need to protect a valve device that moves continuously (in and out of the hatch device), between the container's loading and unloading points.

A fifth technical problem associated with the aforementioned developments lies in the fact that since the valve device can be removed from its operating position, the container must be resealed to avoid thermal loss, loss of sanitary insulation and loss of atmospheric control.

ABSTRACT OF THE INVENTION

The main purpose of the present invention is to provide a hatch device to support, hold and retain a removable atmosphere controller and/or control valve in its proper position, whose shape and structural setup ensure the least possible intervention of the refrigerated container and keeping it airtight, whether or not the control valve is in place.

Another purpose of the invention is to provide a hatch device to support an atmosphere controller and/or control valve for a refrigerated cargo container, whose design allows to protect such equipment, keeping it in the container during installation. It prevents the need to make any major interventions in the container, and reduces the time and man-hours required to start up or transform a normal refrigerated container into a refrigerated container with controlled atmosphere.

Yet another purpose of the invention is to provide a hatch device to support an atmosphere controller device and/or valve in a cargo container, whose design allows the container intervention to be used multiple times (reusable), thereby providing a reusable atmosphere controller device and/or valve. This is done in such a way that the hatch device is permanently placed in the container, without the need to return it to its initial condition. Thus, the container is always available for use as a controlled atmosphere refrigerated container, through the simple installation and operation of this atmosphere controller device and/or valve.

The invention provides a hatch device to hold an atmosphere control device and/or valve, so that a normal refrigerated container can be transformed into a controlled atmosphere refrigerated container in a quick, simple, labor-saving and low-cost manner, through the simple installation of an atmosphere control device and/or valve in the hatch device, placed inside the refrigerated cargo container, in such a way that the design of said hatch device allows for constant monitoring of the container's airtightness.

In general, the term "major modifications" refers to the fact that the container is fitted with a series of components that must be modified in order for it to operate as a refrigerated container. These components take up vital space to transform this container into one with a controlled atmosphere. In other words, some components of the refrigeration unit, such as devices related to the power supply, sometimes require mechanical movement. On the other hand, sealing elements are required once the controlling equipment is removed, and/or an additional compressor is added to the compressors in the normal refrigerated containers, and/or systems are installed to filter and ventilate carbon dioxide, such as carbon dioxide membranes or scrubbers, and/or activated carbon is added to retain and clean carbon dioxide from the atmosphere. Fixed valves are also included to ventilate and to allow oxygen to enter.

In general, the term "reduce energy consumption" refers to the fact that the normally operating device is able to mechanically support a valve device (by convection). This way, energy usage is low enough that the valve device can be fitted with a battery.

In general, the term "compact" refers to the fact that all parts and pieces of the hatch device are contained within the same device and do not require wired electrical connections either inside or outside the container.

In general, the term "reusable" refers to the fact that the device, once installed, can be used for its purpose continuously, either when the device is locked without the valve device or when the valve device has been inserted into the valve device and is operational.

In general, the term "intervention in a refrigerated container" refers to the physical modifications required by a container equipment in order to be able to connect the atmospheric control systems. For the devices in the present invention, the preferred location is the standard hatch area of the container as described in the prior art, without excluding other areas where it can also be fitted inside the refrigerated container.

In general and for the sake of clarity, a total listing of all parts and pieces of the present development is provided below:

(1) Hatch device
(2) Service hatch cover
(3) Main support body
(4) Main anchor hole
(5) Hollow cone
(6) Cover
(7) Anchorage
(8) Front protection surface
(9) Rear anchoring surface
(10) Hole
(11) Sliding cover
(12) Open cutout

(13) Cutout
(14) Nozzle
(15) Nozzle opening
(16) Nozzle recess
(17) Nozzle inner surface
(18) Seal
(19) Connection pipe
(20) Nozzle outer surface
(21) Edges
(22) Guiding and fastening segments
(23) Protruding Fixation Ribs
(24) Flow guide piece
(25) Main elongated body
(26) Longitudinal opening
(27) Conduction pipe
(28) Memory retractable hose
(29) Perforated flaps
(30) Plug
(31) Atmosphere control valve device
(32) Attachment bore
(33) Hollow body
(34) Rear end of the plug
(35) Front end of the plug
(36) Rear flange
(37) Accordion Flange
(38) Front Wall
(39) T-anchor slot
(40) Means of attachment
(41) Plug connector cover
(42) Connector slot
(43) Attachment hole
(44) Connector piece
(45) Cover Guide
(46) Notches
(47) Small cones
(48) Foam blocks
(49) Non-slip bumps
(50) Long flange or Protection guide
(51) Upper and lower anchoring elastic hooks
(52) Valve guides
(53) Slotted nozzle
(54) Clamps
(55) Protective foam for the longitudinal opening
(56) Plug ribs
(57) Secondary Connectors Slot
(58) Gas exchange slots
(59) Device brand
(60) Seal hole

DESCRIPTION OF THE FIGURES

To provide more clarity about the invention's characteristics, a set of figures for a preferred embodiment are included as part of the description. The invention has been portrayed as such for illustrative purposes only, without limiting itself to this embodiment.

Figure 1:
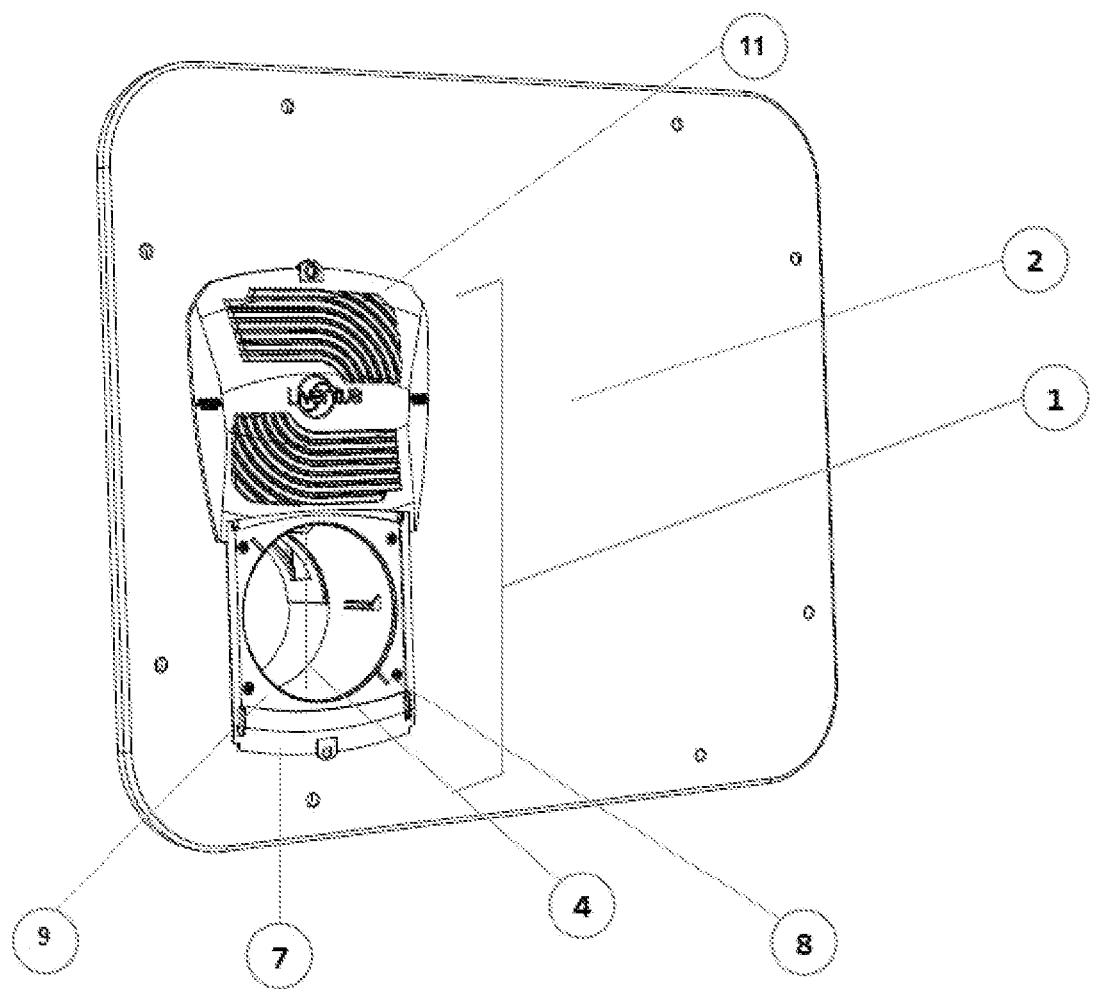
FIG. 1

This is a perspective view of a hatch device for an atmosphere control valve device, corresponding to the invention incorporated into a container's service hatch cover.

Specifically, the figure shows the following reference numbers:
(1) Hatch device
(2) Service hatch cover
(4) Main anchor hole
(7) Anchorage
(8) Front protection surface
(9) Rear anchoring surface
(11) Sliding cover

FIG. 2

This is a perspective top view of the service hatch cover and part of the invention's hatch device.

Specifically, the figure shows the following reference numbers:
(1) Hatch device
(2) Service hatch cover
(3) Main support body
(5) Hollow cone
(6) Cover
(9) Rear anchoring surface
(10) Hole
(13) Cutout
(50) Long flange or Protection guide

FIG. 3

This is a rear view of a container's service hatch cover, showing part of the elements comprising the invention's hatch device.

Specifically, the figure shows the following reference numbers:
(12) Open cutout
(14) Nozzle
(15) Nozzle opening
(18) Seal
(19) Connection pipe
(20) Nozzle outer surface
(21) Edges
(22) Guiding and fixing segments
(23) Protruding Fixation Ribs
(48) Foam blocks
(52) Valve guides
(53) Slotted nozzle

FIG. 4

This is a cut-out view of one of the elements comprising the invention's hatch device.

Specifically, the figure shows the following reference numbers:
(13) Cutout
(14) Nozzle
(15) Nozzle opening
(16) Nozzle recess
(17) Nozzle inner surface
(18) Seal
(19) Connection pipe
(21) Edges
(22) Guiding and fastening segments

FIG. 5

This is a top view in cut-out perspective of part of one of the elements comprising the invention's hatch device and its setup on the container's service hatch cover.

Specifically, the figure shows the following reference numbers:
(24) Flow guide piece
(25) Main elongated body
(26) Longitudinal opening
(27) Conduction pipe
(28) Memory retractable hose
(29) Perforated flaps
(48) Foam blocks
(54) Clamps
(55) Protective foam for the longitudinal opening

FIG. 6

FIG. 6a.—this is a lateral view showing a cut-out view of the seal plug of the invention's support device.

Specifically, the figure shows the following reference numbers:
(30) Plug
(32) Attachment bore
(33) Hollow body
(34) Rear end of the plug
(35) Front end of the plug
(36) Rear flange
(37) Accordion Flange
(38) Front Wall
(39) T-anchor slot
(40) Means of attachment
(41) Plug connector cover
(42) Connector slot FIG. 6b.—this is a front view of a plug with a fitted connecting piece.

Specifically, the figure shows the following reference numbers:
(36) Rear flange
(39) T-anchor slot
(41) Plug connector cover
(42) Connector slot
(43) Attachment hole
(44) Connector piece
(47) Small cones
(56) Plug ribs
(57) Secondary Connectors Slot

FIG. 7

This is a side view of the setup where the plug is placed as a part of the invention's hatch device.

Specifically, the figure shows the following reference numbers:
(1) Hatch device
(2) Service hatch cover
(5) Hollow cone
(11) Sliding cover
(14) Nozzle
(30) Plug
(31) Atmosphere control valve device
(48) Foam blocks
(49) Non-slip bumps
(50) Long flange or Protection guide
(51) Upper and lower anchoring elastic hooks
(58) Gas exchange slots
(59) Device brand
(60) Seal hole

FIG. 8

This is a front and side view of the sliding cover and its anchorage area.

Specifically, the figure shows the following reference numbers:
(45) Cover Guide
(46) Notches
(49) Non-slip bumps
(50) Long flange or Protection guide
(51) Upper and lower anchoring elastic hooks
(52) Valve guides
(58) Gas exchange slots
(59) Device brand
(60) Seal hole

FIG. 9

This is a side, cross-sectional view of a supporting device of the invention, installed in a container's service hatch cover.

Specifically, the figure shows the following reference numbers:
(1) Hatch device
(2) Service hatch cover
(14) Nozzle
(24) Flow guide piece
(30) Plug
(31) Atmosphere control valve device
(53) Slotted nozzle

PREFERRED EMBODIMENT OF THE INVENTION

Figure 3:
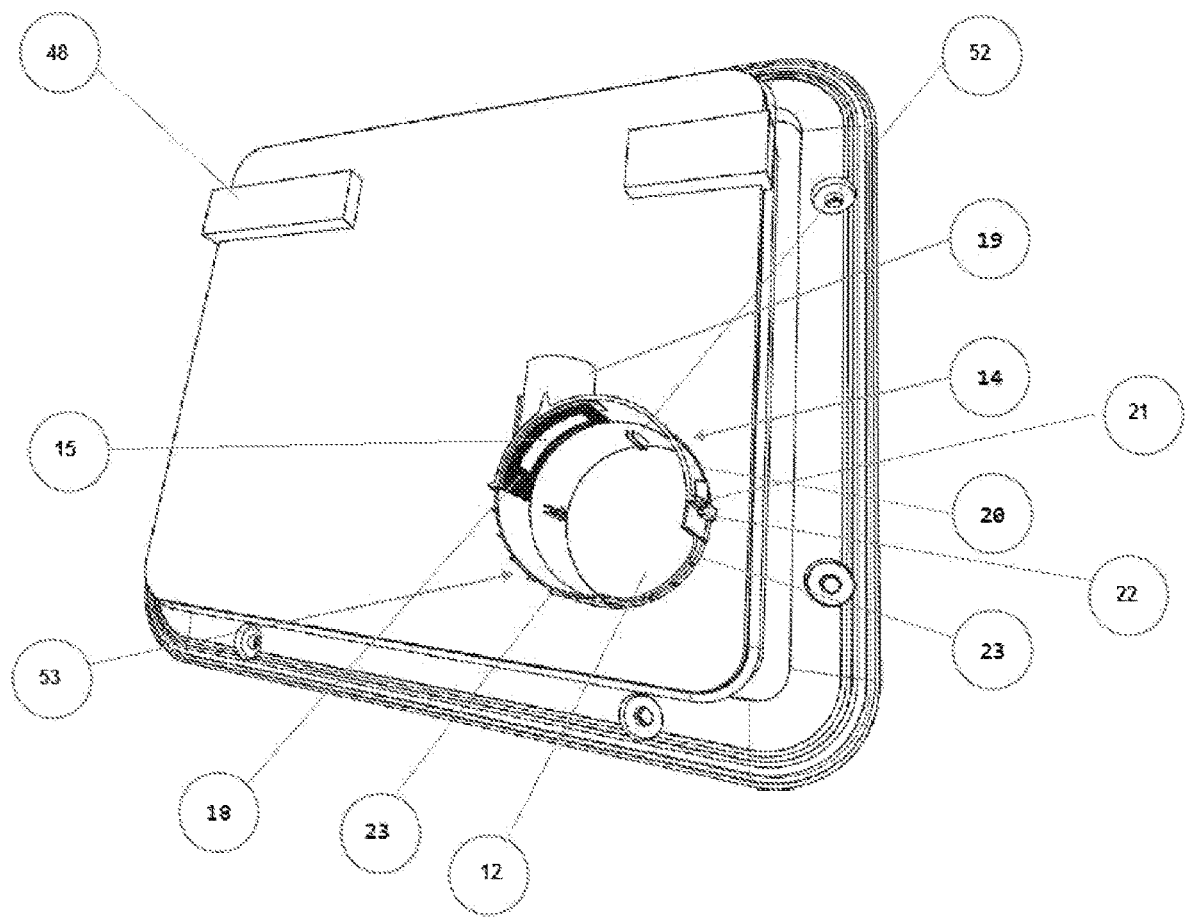
Figure 4:
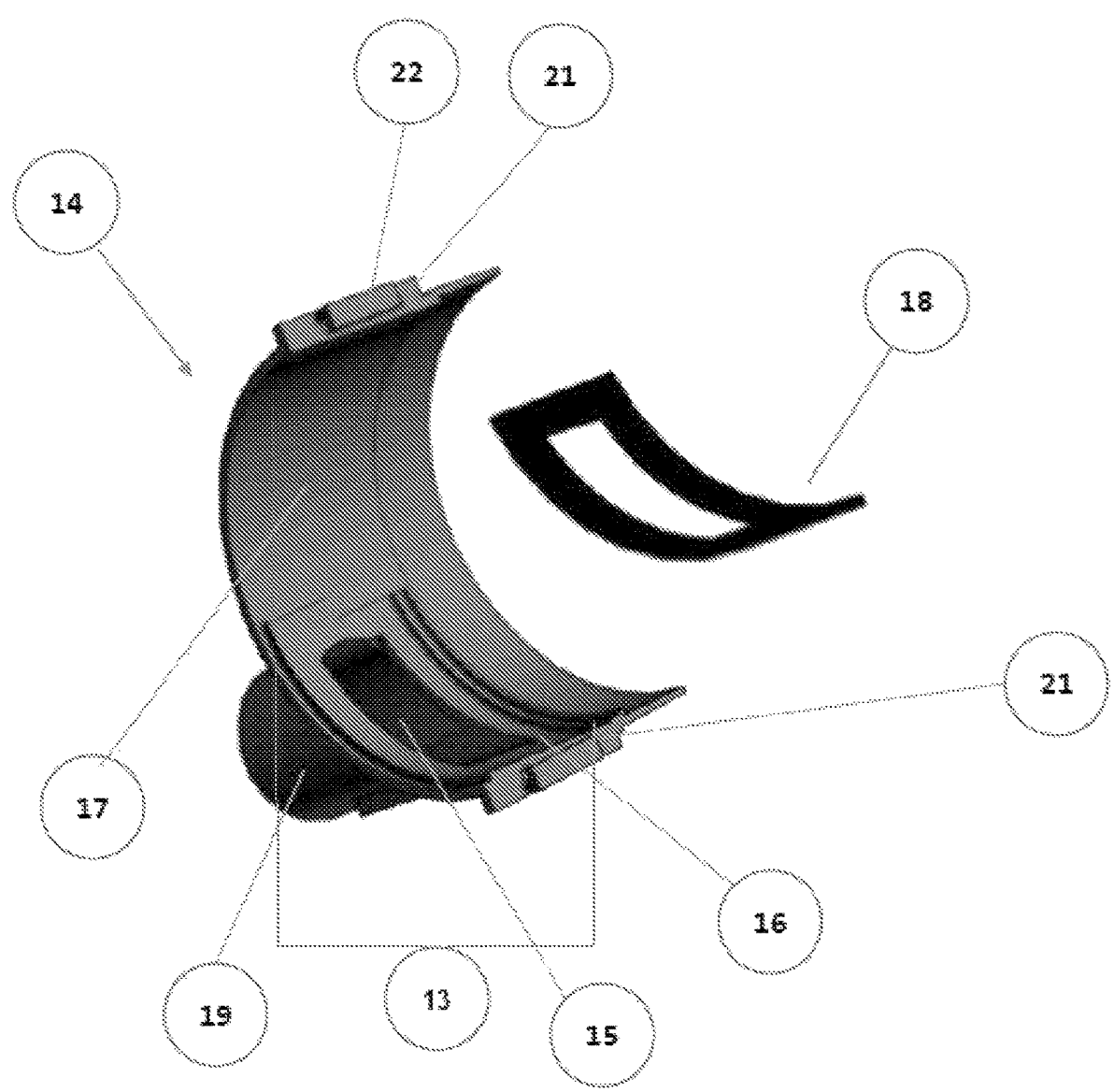
Figure 7:
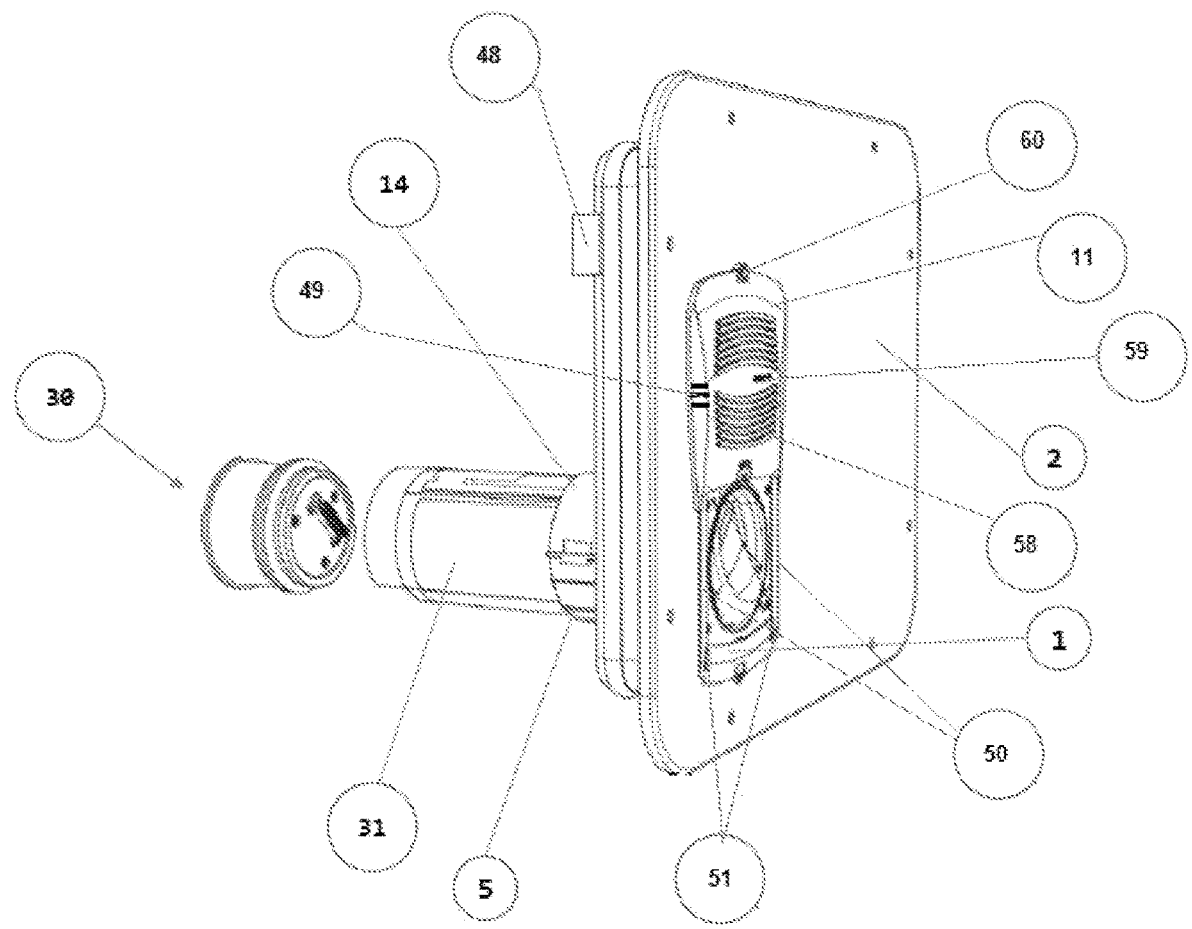

The invention corresponds to a hatch device used to equip a refrigerated cargo container with an atmosphere control valve device (31), in order to safely provide a refrigerated container with atmosphere control by way of an airtight seal that requires minimum intervention of the container. As shown in FIG. 1/9, a hatch device (1) for an atmosphere control valve device (31) is fitted in a refrigerated container's service hatch cover (2). The hatch device consists of a main supporting body (3) with a central anchorage hole (4), where the atmosphere control valve device (31) can be inserted, as shown in FIG. 7/9. The main support body (3) of the hatch device (1) is shaped like a hollow cone (5) with slightly uneven cone inlet and outlet diameters, which has a cover (6) on its front side, towards the outside of the container, consisting of two elements: a bolted anchorage (7) that is part of the hollow cone (5) and whose anchorage (7) has a front protection surface (8); and a rear anchorage surface (9), whose anchorage (7) has a larger diameter than the diameter of a hole (10) in the container's service hatch cover (2), and that is attached to the service hatch cover (2). The hollow cone (5) with the anchor (7) forming the main supporting body (3) of the hatch device (1) is attached to the service hatch cover's surface (2) in such a way that the anchor (7) is fixed to the front surface of the service hatch cover, by inserting the cone (5) into the hole (10) of the service hatch (2), making it protrude from the rear surface of the service hatch cover (2), as shown in FIG. 3/9.

Figure 2:
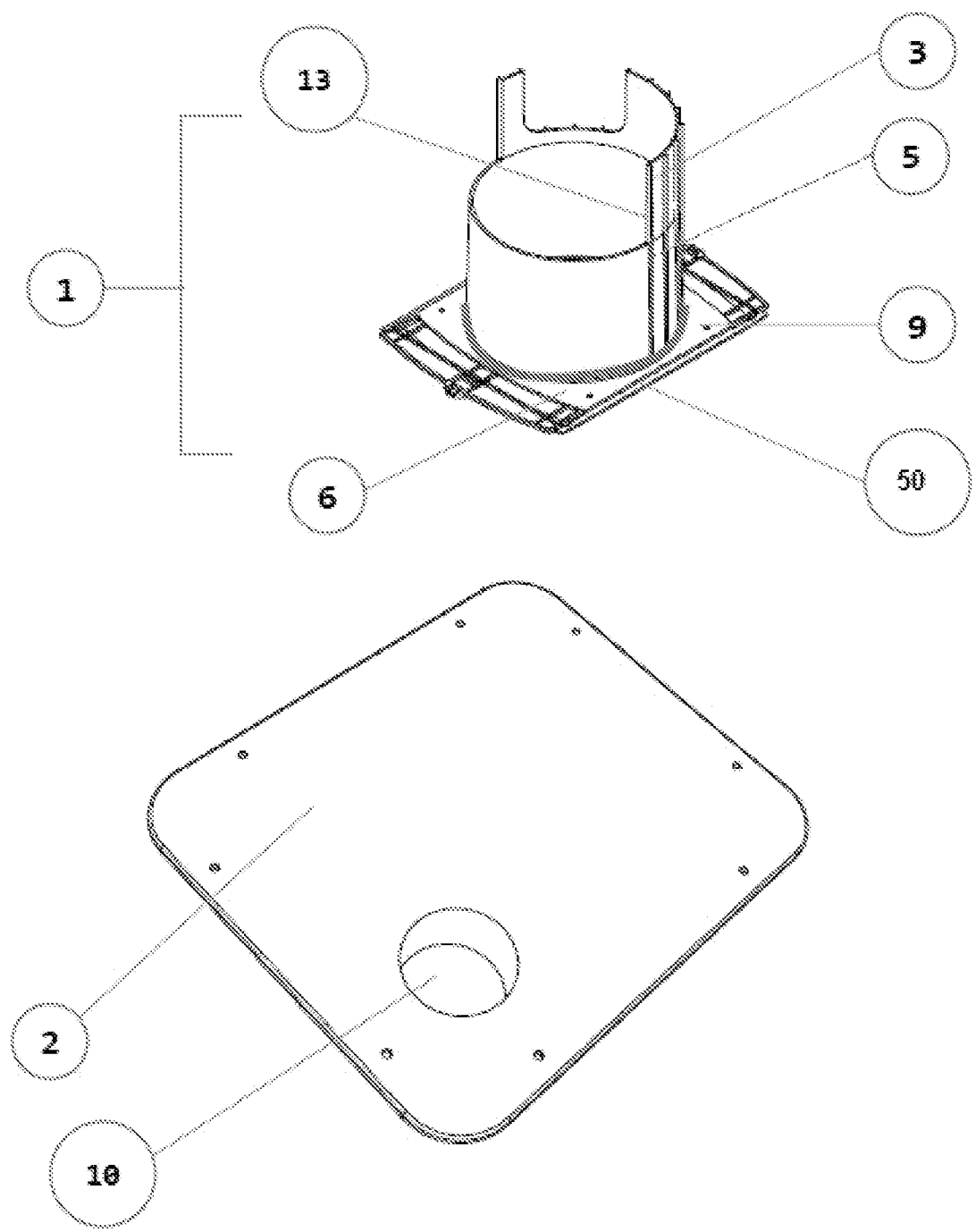
Figure 8:
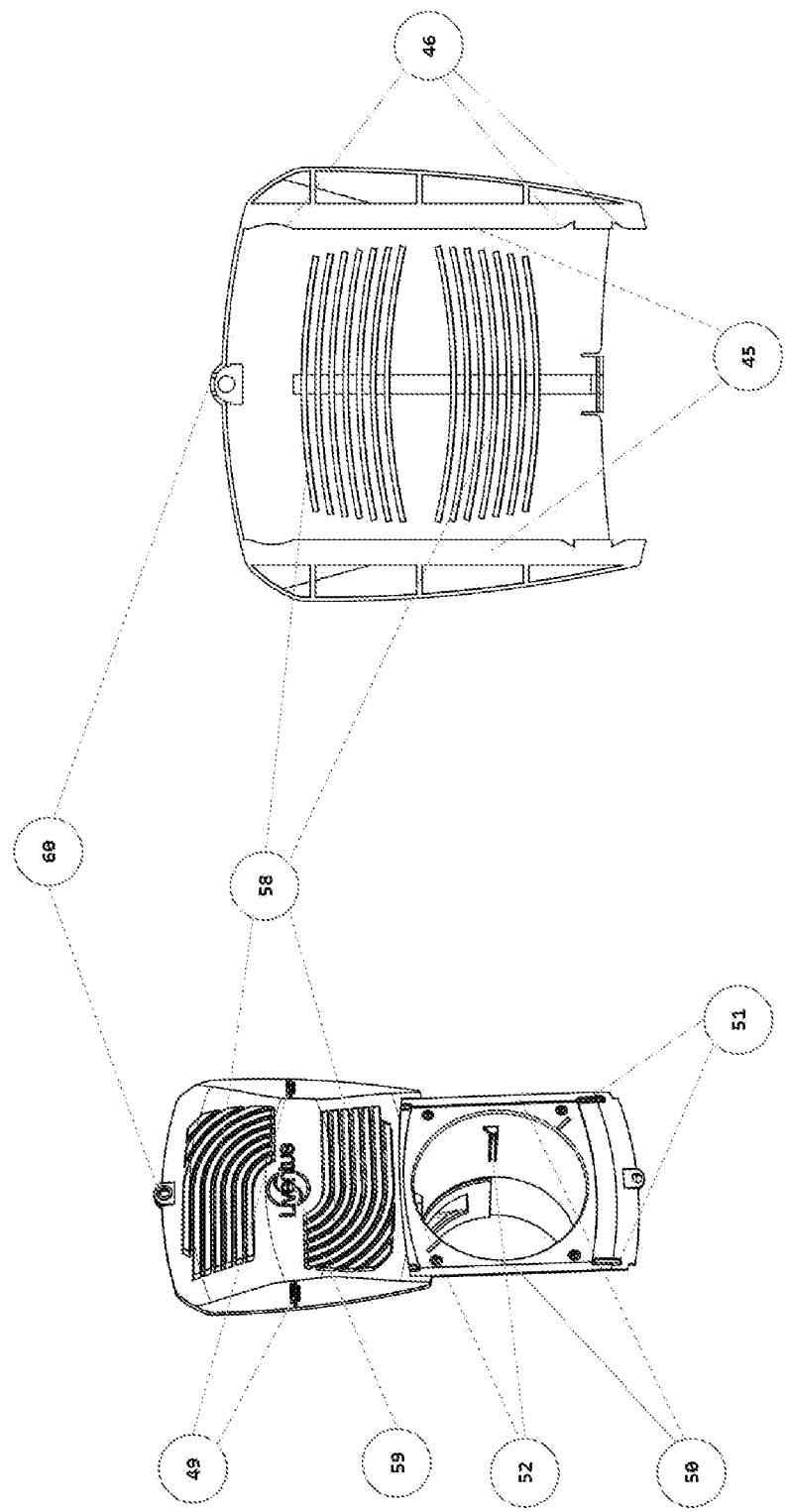
Figure 9:
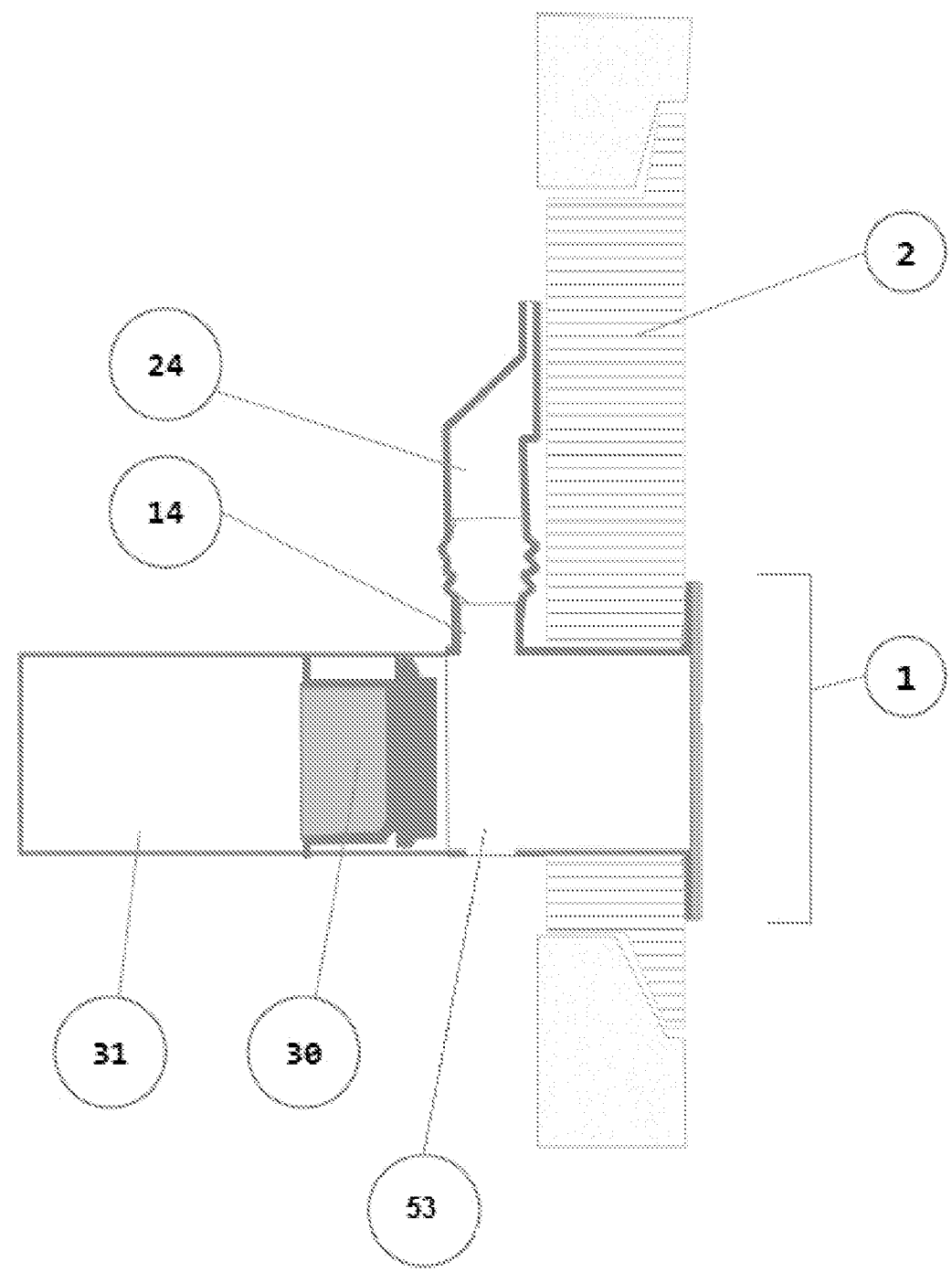

As shown in FIGS. 1/9 and 7/9, the anchorage (7) on the front protection surface (8) is fitted with a sliding cover (11). By means of two cover guides (45) on the inside or towards the container, the sliding cover (11) slides on a protection guide (50) located on the front protection surface (8) away from the container and from the anchorage (7), so when an atmosphere control valve device (31) is fitted to the hatch device (1), it covers it and prevents it from being removed or tampered with. On the other hand, each cover guide (45) has a series of notches (46), two in the shape of a nose at the bottom and one in the shape of a semi-circle at the top, whose purpose is to restrict the upward and downward movement of the sliding cover (11) on the front protection surface (8) in order to leave the cover in a fixed position according to the operation being performed by the atmosphere control valve device (31). This same sliding cover (11) also includes a hole (60) at the top to allow some sort of seal to be passed through, to avoid unauthorized manipulation of the atmosphere control valve device (31). There are also slots (58) at the top and bottom of the sliding cover (11) that allow the exchange of gases, and in between these slots, towards the outside of the container, there may be a 3-D image of the device brand (59), such as 'Liventus®', yet unrestricted to this brand alone. Likewise, the sliding cover (11) on the sides of the brand has two non-slip bumps (49) so the operator's fingers can open or close the sliding cover (11). The front protection surface (8) has a long flange (50)

along its entire vertical side, on both sides, which allows the cover guide (45) to be fitted and move vertically. This long flange (50) is not glued directly onto the service hatch cover (2), leaving instead a small opening where there are two upper and lower elastic hooks (51) that allow the cover (11) to be anchored through the notches (46) as shown in FIG. 8/9. The cone (5), on its inner surface near the front protection surface (8), has two valve guides (52) placed at the top of the cone (5) and at 90° to the right, when looking from the outside of the container toward the inside. These valve guides (52) can be as long as the cone (5), although their length will preferably be one-third of it. The purpose of these valve guides (52) is to help position the atmosphere control valve device (31) correctly so that it can operate with the support of the convection forces generated inside the container. On the other hand, the cone (5) has a cutout (13) at the rear, which protrudes from the rear surface of the hatch into the container vertically and upwards, as shown in FIG. 2/9. This cutout (13) joins the nozzle piece (14), which can be seen in FIGS. 3/9 and 4/9. This nozzle piece (14) has the same shape as the cone's (5) cutout (13), extending the cone's body (5). The nozzle part consists of a nozzle opening (15) surrounded by a nozzle recess (16) on the inner surface (17) of the nozzle part (14), so that a seal (18) can be attached to the recess (16). A connection pipe (19) protrudes from the outer smooth surface of the nozzle (20), encompassing the entire opening (15). The edges (21) that enclose the nozzle part (14) contain a guiding and fastening element (22), letting the nozzle part (14) to be attached to the cone (5) and the slotted nozzle part (53), so that the nozzle part (14) covers the cone (5) cutout (13), aligning it with the rear surface of the hatch, where the cone (5) is already fitted. The slotted nozzle piece (53) is located on the opposite side of the nozzle piece (14). It has protruding fastening ribs (23) that allow the nozzle piece (14) and slotted nozzle piece (53) to slide both into the cone (5) as a whole, forming a circle, until it touches the rear surface of the service hatch cover (2). All nozzle parts and slotted nozzle, are sealed on the inside of the service hatch cover with different sealing chemicals, such as industrial silicones or other industrial adhesives. On the other hand, the slotted nozzle piece (53) has an open cutout (12) of the same size as the cutout (13) opposite to the nozzle piece (14), but without the cutout's (13) bridge. The nozzle parts (14) and the slotted nozzle (53) are also joined together by an adhesive and externally by an insulating adhesive, but are held together by the two edges (21) and the guiding and fastening segments (22).

Figure 5:
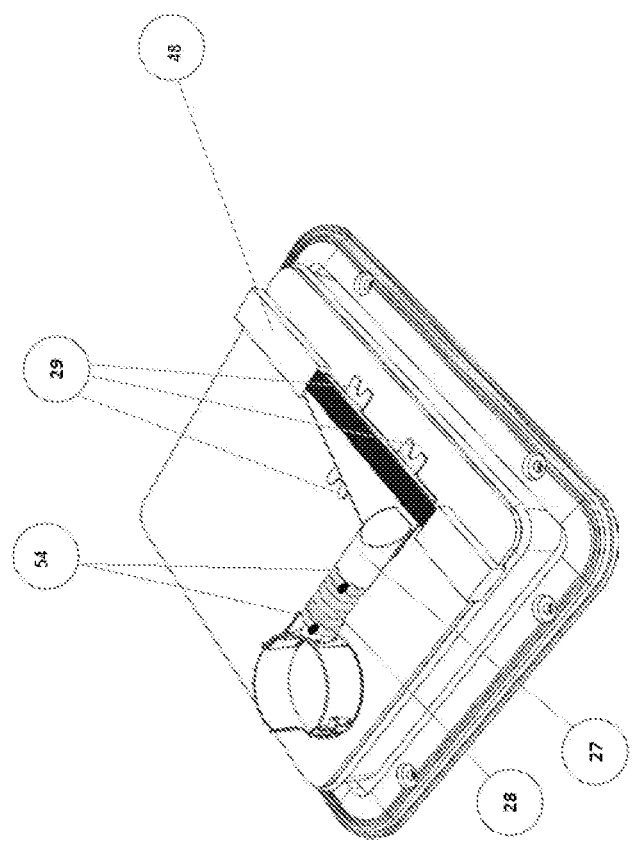
Figure 5:
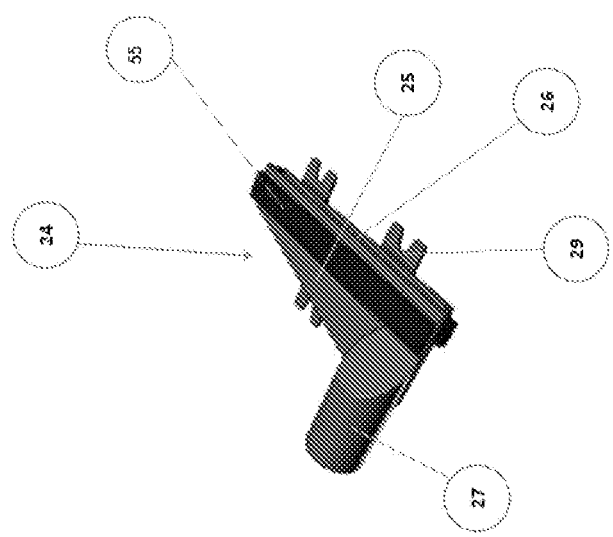

As shown in FIG. 5/9, the nozzle piece (14) allows attaching a flow control piece (24), which is shown in detail in FIG. 5/9. The flow control piece consists of an elongated main body (25) with a longitudinal opening (26) and a protective foam for said longitudinal opening (55). The flow guide piece (24) has a flow pipe (27) that protrudes from the elongated main body (25). The flow pipe (27) can be connected to the connection pipe (19) of the nozzle piece (14) by means of a memory retractable hose (28). The flow control piece (24) is attached to the rear surface of the service hatch cover (2) by means of a series of perforated flaps (29) that allow the flow control piece (24) to be screwed to the rear surface of the service hatch cover (2), to generate a flow channel between the refrigerated container and an atmosphere control valve device (31) fitted to the hatch control device (1) for atmospheric control. On the other hand, the perforated flaps (29) are coated with a chemical sealant, preferably industrial silicone, to prevent manipulation and corrosion. Preferably there should be three perforated flaps, although other setups should not restrict themselves to this number. The memory retractable hose (28) can also be optionally connected to the pipe (27) on one side and to the connecting pipe (19) on the other side by two clamps (54). This same memory retractable hose (28) can be optionally fitted with a wire cable on the inside to keep it steady once installed. One way to prevent the flow control piece (24) from bumping during installation is to add two foam blocks (48) to the sides of the elongated main body (25), very close to the longitudinal opening (26).

Figure 6:
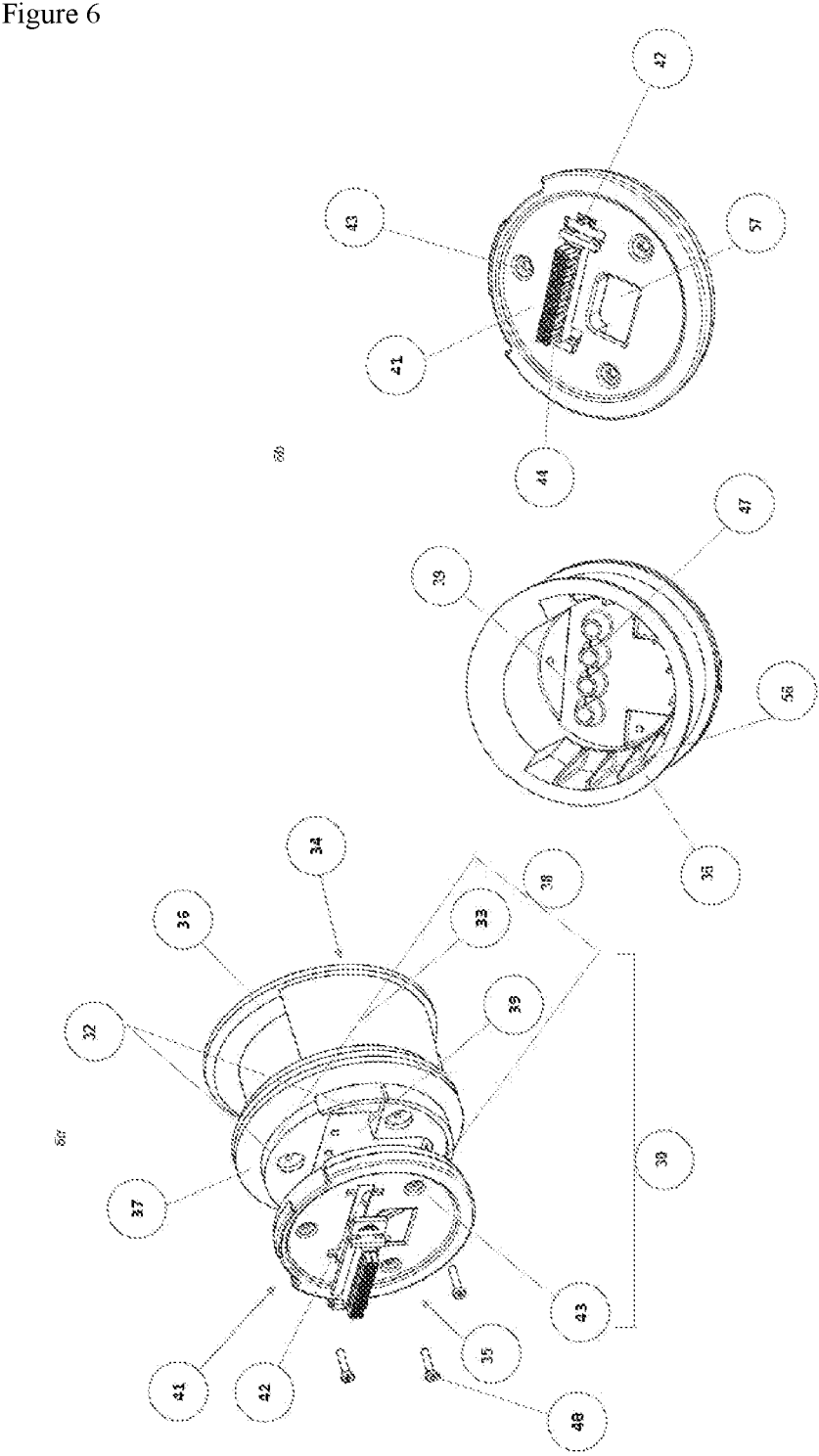

The hatch device (1) consists of a plug (30), as shown in FIGS. 6/9 *a* and *b*, 7/9 and 9/9, which is set up as a flexible rubber plug (30) that may be optionally fitted with atmosphere control valve device (31) (see FIG. 7/9). It is positioned in the hole created by the installation of the cone (5) in the hole (10) or the opening of the service hatch cover, to attach the hatch device (1) of the present invention. Thus, the plug becomes part of the hatch device (1).

The plug (30) has a hollow body (33) with a rear end (34) and a front end (35), with a protruding edge at the rear end, such as a rear flange (36). The front end is made up of an elastic and flexible accordion flange (37) and a front wall (38) with a T-shaped slot (39) and at least one attachment bore (32), preferably three, to secure means of attachment (40), such as screws with their respective nuts and bolts. These allow a plug connector cover piece (41) to be attached to the plug's (30) front wall (38). The plug connector cover has a connector slot (42), a secondary connector slot (57) below the connector slot (42) and at least one attachment bore, preferably three (43). At least one fixing means (40) passes through them to secure the plug connector cover (41) to the plug's (30) front wall (38). The setup of this plug connector cover part (41) allows a connector part (44) to be inserted into the connector slot (42) (see FIG. 6/9 *b*). This way, the connector part (44) is placed in the connector part slot (42) of the connector cover part (41), thereby inserting the connector part (44) into the front wall (38) plug's (30) T-anchor slot (39) The T-anchor slot has four small cones (47) on its rear, which are connected laterally and are used to feed the various connections from the connector part (44) to various devices or sensors that can be controlled in the container by the atmosphere control valve (31).

Inside, the plug has an area of ⅔ of its internal surface with plug ribs (56), which give it structure and firmness. On this side, the small cones (47) are placed at the bottom of the plug (30).

The hatch device (1) for an atmosphere control valve device (31), protects this equipment, keeping it in the container during installation, without the need to carry out major interventions on it. This reduces the time and manpower required to transform a refrigerated container into a controlled atmosphere refrigerated container. The atmosphere control valve device (31) can be reused, and the hatch device (1) is permanently located in the container, without the need to return it to its initial condition (but with the cover (30) in its place), so that the container is always ready to be used as a controlled atmosphere refrigerated container.

The plug (30) is optionally fitted in the hatch device (1) of the present invention, allowing the container to be kept sealed, when not used with an atmosphere control valve device (31).

The setup and operation of the hatch device for an atmosphere control valve device of the present invention provides a hatch device that is installed in a container, without the need to make any subsequent changes. It can be used in any application, without performing major interventions on the container. This reduces the time and manpower required to implement the system in the container, while providing the necessary airtightness to the container, whether or not an atmosphere control device is in place. This provides a less complex solution than those in the prior art.

While the shape of the hatch device for an atmosphere control valve device in a refrigerated cargo container described herein represents a preferred embodiment of this invention, it should be noted that the invention is not limited to this precise shape of the hatch device, and that changes may be made to it without deviating from the scope of the invention.

The invention claimed is:

1. A hatch device comprising a main support body (3) with a main anchorage hole (4), which also has a hollow cone (5), with uneven inlet and outlet diameters, with a cover (6) on its front side, towards the outside of a container, including: an anchorage (7) fixed by bolts that is part of the hollow cone (5); a flow guide piece (24); and an optional plug (30); WHEREIN the hollow cone (5), on its inner surface near a front protection surface (8) has two valve guides (52), one on the top of the hollow cone (5) and another at 90° to the right, while looking from the outside of the container toward the inside; wherein said valve guides (52) can be as long as the hollow cone (5), but preferably one-third of the hollow cone, so that said valve guides (52) correctly align an atmosphere control valve device (31); and WHEREIN the flow guide piece (24) has an elongated main body (25) having a longitudinal opening (26) and a protective foam (55) of the longitudinal opening (26), where the flow guide piece (24) has a conduction pipe (27) that protrudes from an elongated main body (25); and WHEREIN said conduction pipe (27) can be connected to a connection pipe (19) of a nozzle piece (14) by means of a memory retractable hose (28); and WHEREIN the plug (30) has a hollow body (33) with a rear end (34) and a front end (35), where the rear end has a hanging edge, such as a rear flange (36), said front end is made up of an elastic and flexible accordion flange (37) with a front wall (38) comprising a T-anchor slot (39) and at least one fixing hole (32), preferably three, to insert a means of attachment (40), such as screws with their respective nuts and washers, which allow attaching a plug connector cover (41) to the front wall (38) of the plug (30); and WHEREIN said connector cover (41) has a connector slot (42), a secondary connector slot (57) below the connector slot (42) and at least one attachment hole, preferably three (43), where at least one of the means of attachment (40) passes to secure the plug connector cover (41) to the front wall (38) of the plug (30).

2. The hatch device, according to claim 1, WHEREIN the hollow cone (5) has a cutout (13) in its rear, which protrudes vertically from the rear surface of the hatch device from the inside of the container and upwards; and WHEREIN said cutout (13) is connected to the nozzle piece (14), and said nozzle piece (14) has the same shape as the cutout shape (13) of hollow cone (5).

3. The hatch device, according to claim 2, WHEREIN the nozzle has a nozzle opening (15) surrounded by a nozzle recess (16) from an inner surface (17) of the nozzle piece (14), so that a seal (18) can be attached to the recess (16), where the connection pipe (19) protrudes from an outer smooth surface (20) of the nozzle piece, enclosing the substantially entire nozzle opening (15).

4. The hatch device, according to claim 2, WHEREIN the nozzle piece (14) is enclosed by edges (21), which have guiding and fastening elements (22), said guiding and fastening elements (22) allowing the nozzle piece (14) to be fixed to the hollow cone (5) and to a slotted nozzle (53), so that the nozzle piece (14) covers the cutout (13) and places the cutout towards a rear surface of the hatch device, where the hollow cone (5) is already located, such that the slotted nozzle (53) remains opposite to the nozzle piece (14).

5. The hatch device, according to claim 4, WHEREIN the slotted nozzle (53) has protruding fixation ribs (23), which allow both the nozzle piece (14) and slotted nozzle (53) to slide as one piece, forming a circle in the hollow cone (5) until it touches the rear surface of a service hatch cover (2).

6. The hatch device according to claim 5, WHEREIN all parts of the nozzle piece (14) and the slotted nozzle (53) are sealed on the inside of the service hatch cover (2) with different sealing chemicals, such as industrial silicones or other types of industrial adhesives, and sealed on the outside by an insulating adhesive, but are held together by a pair of edges (21) and the guiding and fastening elements (22).

7. The hatch device according to claim 4, WHEREIN the slotted nozzle (53) has an open cutout (12) that is the same size as the cutout (13) opposite to the nozzle piece (14).

8. The hatch device, according to claim 1, WHEREIN the nozzle piece (14) can be attached to the flow guide piece (24).

9. The hatch device according to claim 1, WHEREIN the flow guide piece (24) is fixed to the rear surface of a service hatch cover (2) by a series of perforated flaps (29) that allow the flow guide piece (24) to be bolted to the rear surface of the service hatch cover (2), where at least one of the series of perforated flaps (29) is covered with a sealing chemical, preferably industrial silicone, to prevent manipulation and corrosion.

10. The hatch device according to claim 9, WHEREIN the series of perforated flaps (29) comprises three perforated flaps.

11. The hatch device according to claim 1, WHEREIN the memory retractable hose (28) can be optionally attached at its ends by a pair of clamps (54) to the conduction pipe (27) on one side and to the connection pipe (19) on the other side, where the memory retractable hose (28) can optionally carry a metal cable inside to keep the memory retractable hose in place once installed.

12. The hatch device according to claim 1, WHEREIN to prevent the flow guide piece (24) from bumping during installation, a pair of foam blocks (48) is placed on opposite sides of the elongated main body (25) in close proximity to the longitudinal opening (26).

13. The hatch device according to claim 1, WHEREIN the plug connector cover (41) allows a connector piece (44) to be fitted into the connector slot (42), thus inserting the connector piece (44) into the T-anchor slot (39) in the front wall (38) of the plug (30).

14. The hatch device according to claim 13, WHEREIN the rear side of the T-anchor slot (39) has four small cones (47) connected laterally, which channel the different connections that come out of the connector piece (44) to different devices or sensors that the atmosphere control valve device (31) can control in the container.

15. The hatch device, according to claim 14, WHEREIN the plug (30) comprises an area of approximately two-thirds (⅔) of internal surface of the plug having a plurality of plug ribs (56), giving the plug structure and firmness, and where the small cones (47) are located at the bottom of the plug (30) on the same side as the plurality of plug ribs are located.

* * * * *